United States Patent
Lin et al.

(10) Patent No.: US 11,570,086 B2
(45) Date of Patent: Jan. 31, 2023

(54) FAST REROUTE FOR BUM TRAFFIC IN ETHERNET VIRTUAL PRIVATE NETWORKS

(71) Applicant: Juniper Networks, Inc., Sunnyvale, CA (US)

(72) Inventors: Wen Lin, Andover, MA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 42 days.

(21) Appl. No.: 17/249,163

(22) Filed: Feb. 22, 2021

(65) Prior Publication Data

US 2022/0272027 A1 Aug. 25, 2022

(51) Int. Cl.
*H04L 45/16* (2022.01)
*H04L 45/02* (2022.01)
*H04L 45/00* (2022.01)
*H04L 45/50* (2022.01)
*H04L 47/32* (2022.01)

(52) U.S. Cl.
CPC .............. *H04L 45/16* (2013.01); *H04L 45/02* (2013.01); *H04L 45/22* (2013.01); *H04L 45/50* (2013.01); *H04L 47/32* (2013.01)

(58) Field of Classification Search
CPC ......... H04L 45/16; H04L 45/02; H04L 45/22; H04L 45/50; H04L 47/32; H04L 12/4633; H04L 12/4641
See application file for complete search history.

(56) References Cited

U.S. PATENT DOCUMENTS

| | | | |
|---|---|---|---|
| 7,990,993 | B1 | 8/2011 | Ghosh et al. |
| 8,806,058 | B1 | 8/2014 | Mackie et al. |
| 11,057,295 | B1 | 7/2021 | Lin et al. |
| 11,303,474 | B1 | 4/2022 | Gornal M. et al. |

(Continued)

FOREIGN PATENT DOCUMENTS

| | | |
|---|---|---|
| CN | 106161253 B | 12/2020 |
| EP | 3641240 A1 | 4/2020 |

(Continued)

OTHER PUBLICATIONS

Sajassi et al., "BGP MPLS-Based Ethernet VPN," RFC 7432, Internet Engineering Task Force (IETF), Feb. 2015, 56 pp.

(Continued)

*Primary Examiner* — Mohamed A Kamara
(74) *Attorney, Agent, or Firm* — Shumaker & Sieffert, P.A.

(57) ABSTRACT

Techniques are described for providing fast reroute for BUM traffic in EVPN. For example, a first provider edge (PE) device, elected as a designated forwarder (DF) of an Ethernet segment, configures a backup path using a label received from a second PE device of the Ethernet segment (e.g., backup DF) that identifies the second PE device as a "protector" of the Ethernet segment. For example, a routing component of the DF configures within a forwarding component a backup path to the second PE device, e.g., installing the label and operation(s) within the forwarding component to cause the forwarding component to add the label to BUM packets received from a core network. Therefore, when an access link to the local CE device has failed, the DF reroutes BUM packets from the core network via the backup path to the second PE device, which sends the BUM packets to the CE device.

20 Claims, 3 Drawing Sheets

(56) References Cited

U.S. PATENT DOCUMENTS

| | | | |
|---|---|---|---|
| 2016/0021015 A1 | 1/2016 | Thoria et al. | |
| 2016/0261487 A1* | 9/2016 | Singh | H04L 45/70 |
| 2017/0141963 A1* | 5/2017 | Chalapathy | H04L 41/12 |
| 2018/0109444 A1 | 4/2018 | Sajassi et al. | |
| 2019/0007309 A1 | 1/2019 | Arora et al. | |
| 2020/0127885 A1 | 4/2020 | Arora et al. | |
| 2020/0280514 A1* | 9/2020 | Zhang | H04L 12/66 |
| 2020/0336334 A1 | 10/2020 | He et al. | |
| 2021/0152464 A1* | 5/2021 | Brissette | H04L 45/28 |
| 2021/0234727 A1* | 7/2021 | Ranpise | H04L 63/0876 |

FOREIGN PATENT DOCUMENTS

| | | | |
|---|---|---|---|
| WO | 20170118880 A1 | 7/2017 | |
| WO | WO-2018047943 A1 * | 3/2018 | H04L 12/4625 |

OTHER PUBLICATIONS

Extended Search Report from counterpart European Application No. 21174188.9, dated Aug. 31, 2021, 11 pp.

Sajassi et al., "BGP MPLS-Based Ethernet VPN; draft-ietf-bess-rfc7432bis-00.txt," BESS Working Group; Internet—Draft, Dec. 21, 2020, 65 pp.

Mahalingam et al., "Virtual eXtensible Local Area Network (VXLAN): A Framework for Overlaying Virtualized Layer 2 Networks over Layer 3 Networks," RFC 7348, Independent Submission, Aug. 2014, 23 pp.

Patel et al., "The BGP Tunnel Encapsulation Attribute", Internet—Draft, retrieved from draft-ietf-idr-tunnel-encaps-22, Jan. 7, 2021, 47 pp.

Rosen, et al., "IANA Registries for BGP Extended Communities," Internet Engineering Task Force, RFC 7153, Mar. 2014, 16 pp.

Sajassi et al., "A Network Virtualization Overlay Solution using EVPN: draft-ietf-bess-evpn-overlay-12", Internet—Draft: Bess Workshop, Internet Engineering Task Force, IETF: Standard Working Draft, Internet Society (ISOC) 4, Rue Des Falaises, CH, 1205, Geneva, Switz, No. 12, Feb. 9, 2019, pp. 1-31, XP015125631.

U.S. Appl. No. 17/301,351, filed Mar. 31, 2021, naming inventors Lin et al.

* cited by examiner

FAST REROUTE FOR BUM TRAFFIC IN ETHERNET VIRTUAL PRIVATE NETWORKS

TECHNICAL FIELD

The disclosure relates to computer networks and, more particularly, to forwarding traffic within computer networks.

BACKGROUND

A computer network is a collection of interconnected computing devices that can exchange data and share resources. Example network devices include switches or other layer two ("L2") devices that operate within the second layer of the Open Systems Interconnection ("OSI") reference model, i.e., the data link layer, and routers or other layer three ("L3") devices that operate within the third layer of the OSI reference model, i.e., the network layer. Network devices within computer networks often include a control unit that provides control plane functionality for the network device and forwarding units for routing or switching data units.

An Ethernet Virtual Private Network ("EVPN") may be used to extend two or more remote L2 customer networks through an intermediate L3 network (usually referred to as a "provider network" or "core network"), in a transparent manner, i.e., as if the intermediate L3 network does not exist. In particular, the EVPN transports L2 communications, such as Ethernet packets or "frames," between customer networks via traffic engineered label switched paths ("LSP") through the intermediate network in accordance with one or more multiprotocol label switching (MPLS) protocols. In a typical configuration, provider edge ("PE") devices (e.g., routers and/or switches) coupled to the customer edge ("CE") devices of the customer networks define label switched paths within the provider network to carry encapsulated L2 communications as if these customer networks were directly attached to the same local area network ("LAN"). In some configurations, the PE devices may also be connected by an IP infrastructure in which case IP/GRE tunneling or other IP tunneling can be used between the network devices.

In an EVPN configuration, a CE device is said to be multi-homed when it is coupled to two or more physically different PE devices on the same EVPN instance when the PE devices are resident on the same physical Ethernet segment. The PE devices on the Ethernet segment provide transport services through the intermediate network to a remote PE device, and each of the PE devices on the Ethernet segment may forward Ethernet frames in the Ethernet segment for the CE device. One of the PE devices on the Ethernet segment is elected as the designated forwarder ("DF") for so called broadcast, unknown unicast, and multicast ("BUM") traffic that is to be flooded within the EVPN based on the MAC addressing information received from the other PE devices. A backup designated forwarder ("BDF" or "backup DF") may also be elected from among the remaining PE device on the Ethernet segment. When a network failure occurs with respect to the current designated forwarder, the other PE devices may execute a designated forwarder election algorithm to determine which of the other PE devices (e.g., backup DF) will become the new designated forwarder and, as a result, assume responsibility for forwarding L2 communications for the CE device. This process is referred to as "global repair."

SUMMARY

In general, techniques are described for facilitating fast reroute for BUM traffic in EVPNs. For example, network devices, e.g., PE devices, may use fast reroute to restore traffic flow in response to a node or link failure while global repair is in process. Typically, a PE device may implement fast reroute by pre-installing in its data plane a backup path that leads to a backup network device for handling traffic. However, based on EVPN forwarding rules, such as designated forwarder filtering and split-horizon filtering rules, a designated forwarder of an Ethernet segment may be inhibited from establishing a backup path over the core network to another PE device (e.g., backup DF) of the Ethernet segment, and the backup DF may not be able to forward the BUM traffic to the local CE device as the global repair process may not have been started or completed. In accordance with the techniques described in this disclosure, a device, such as a first PE device, that is elected as a designated forwarder of the Ethernet segment may configure a backup path using a label that indicates a second device, such as a second PE device (e.g., a backup DF), of the Ethernet segment as a "protector" of the Ethernet segment. The label is referred to herein as a "BUM fast reroute label" or a "protector label."

As one example, the backup DF may generate a BUM fast reroute label (i.e., the special purpose "protector label") used to indicate that the backup DF is authorized to forward BUM traffic on the Ethernet segment to the local CE device in the event an access link of the DF has failed. The backup DF sends the BUM fast reroute label (e.g., as an extended community of an Ethernet Auto-Discovery route) to the DF. The backup DF may also configure its forwarding component to forward a BUM packet that it receives from the core network on the Ethernet segment if the BUM packet includes the BUM fast reroute label.

In response to receiving the BUM fast reroute label, the designated forwarder for the EVPN may configure a backup path to the backup DF (e.g., the device that advertised the BUM fast reroute label) over the core network. For example, a routing component of the designated forwarder may configure a forwarding component of the designated forwarder by installing the BUM fast reroute label within the forwarding plane and one or more operations to cause the forwarding component to add the BUM fast reroute label to any BUM packet received from the core network when rerouting the BUM packet back into the core network along the backup path to the backup designated forwarder. As one example, the designated forwarder may add a label stack including the BUM fast reroute label, an Inclusive Multicast Ethernet tag (IMET) label to send the BUM packet to the backup designated forwarder, and a transport label to reach the backup designated forwarder. In this way, when the designated forwarder receives a BUM packet over the core network and the access link from the designated forwarder to the local CE device has failed, the designated forwarder may add the BUM fast reroute label to the BUM packet and forward the BUM packet including the BUM fast reroute label back into the core network to the backup designated forwarder. When the backup designated forwarder receives the BUM packet including the BUM fast reroute label, the backup designated forwarder may forward the BUM packet on the Ethernet segment to the local CE device.

The techniques provide one or more example technical advantages. For example, by a backup device of the Ethernet segment (e.g., backup designated forwarder) advertising a BUM fast reroute label, a designated forwarder is enabled to install a backup path, notwithstanding the split-horizon filtering rule typically required in EVPNs, thereby using the BUM fast reroute label to enable rerouting of BUM traffic that was received from a core network back into the core network to the backup device. Moreover, by configuring the backup designated forwarder to forward BUM traffic including the BUM fast reroute label, the backup designated forwarder forwards BUM traffic to a local CE device, notwithstanding the DF filtering rule. In this way, the PE devices may provide fast reroute for BUM traffic, and thus provide faster convergence (e.g., sub-second convergence) in the event an egress access link failure occurs, while maintaining EVPN forwarding rules such as the split-horizon filtering and DF filtering rules for other packets not including the BUM fast reroute label.

In one example, a method includes receiving, by a first provider edge (PE) device of an Ethernet segment and from a second PE device of the Ethernet segment, a label identifying the second PE device as a protector for the Ethernet segment, wherein the Ethernet segment provides a customer edge (CE) device that is multi-homed to the first PE device and the second PE device with reachability to an EVPN instance, and wherein the first PE device is a designated forwarder; configuring, by a routing component of the first PE device and within a forwarding component of the first PE device, a backup path to the second PE device, wherein configuring the backup path comprises installing the label within the forwarding component and one or more operations causing the forwarding component to add the label to a BUM packet received from a core network; receiving, by the forwarding component of first PE device, a BUM packet from the core network; and rerouting, by the forwarding component of the first PE device and when an access link from the first PE device to the CE device has failed, the BUM packet on the backup path by adding the label to the BUM packet and forwarding the BUM packet including the label on the backup path to the second PE device over the core network.

In another example, a method includes generating, by a routing component of a first provider edge (PE) device of an Ethernet segment, a label identifying the first PE device as a protector for the Ethernet segment, wherein the Ethernet segment provides a customer edge (CE) device that is multi-homed to the first PE device and a second PE device with reachability to an Ethernet Virtual Private Network (EVPN) instance, and wherein the second PE device is a designated forwarder for the Ethernet segment; sending, by the routing component of the first PE device, the label to the second PE device; configuring, by a routing component of the first PE device, a forwarding component of the first PE device to forward a broadcast, unknown unicast, and multicast (BUM) packet that is received from a core network on the Ethernet segment if the BUM packet includes the label; receiving, by the forwarding component of the first PE device, a BUM packet from the core network, wherein the BUM packet includes the label; and sending, by the forwarding component of the first PE device, the BUM packet on the Ethernet segment to the CE device.

In yet another example, a first provider edge (PE) device of an Ethernet segment, comprising: a forwarding component; and a routing component configured to: receive, from a second PE device of the Ethernet segment, a label identifying the second PE device as a protector for the Ethernet segment, wherein the Ethernet segment provides a customer edge (CE) device that is multi-homed to the first PE device and the second PE device with reachability to an Ethernet Virtual Private Network (EVPN) instance, wherein the first PE device is a designated forwarder (DF) for the Ethernet segment, and wherein the second PE device is a backup designated forwarder for the Ethernet segment; and configure, within the forwarding component, a backup path to the second PE device over a core network, wherein configuring the backup path comprises installing the label within the forwarding component and one or more operations causing the forwarding component to add the label to a broadcast, unknown unicast, and multicast (BUM) packet received from the core network; and wherein, in response to the configuration of the backup path, the forwarding component is configured to: receive a BUM packet from the core network; and reroute, when an access link from the first PE device to the CE device has failed, by adding the label to the BUM packet and forwarding the BUM packet including the label on the backup path to the second PE device over the core network.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF DRAWINGS

Like reference characters denote like elements throughout the figures and text.

DETAILED DESCRIPTION

Figure 1:
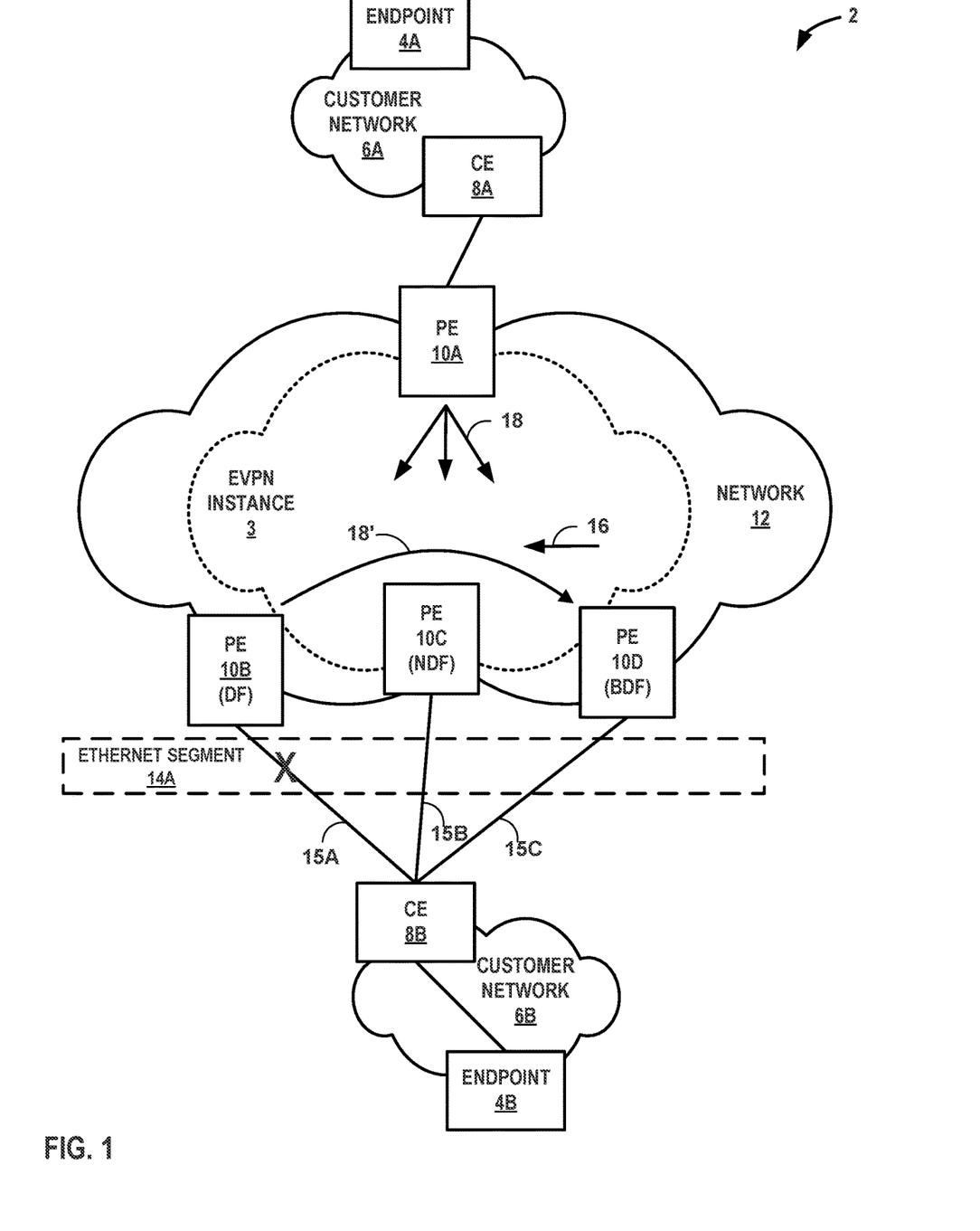
FIG. 1 is a block diagram illustrating a network system configured to provide fast reroute for BUM traffic in EVPN, in accordance with one or more aspects of the techniques described in this disclosure.

FIG. 1 is a block diagram illustrating a network system 2 configured to provide fast reroute for BUM traffic in EVPN, in accordance with one or more aspects of the techniques described in this disclosure. As shown in FIG. 1, network system 2 includes customer networks 6A-6B ("customer networks 6") connected to an intermediate network 12. Intermediate network 12 may represent a public network that is owned and operated by a service provider to interconnect a plurality of edge networks, such as customer networks 6. Intermediate network 12 is a layer 3 ("L3") network in the sense that it natively supports L3 operations as described in the OSI model. Common L3 operations include those performed in accordance with L3 protocols, such as the Internet protocol ("IP"). L3 is also known as a "network layer" in the OSI model and the "IP layer" in the TCP/IP model, and the term L3 may be used interchangeably with "network layer" and "IP" throughout this disclosure. As a result, intermediate network 12 may be referred to herein as a Service Provider ("SP") network or, alternatively, as a "core network" considering that network 12 acts as a core to interconnect edge networks, such as customer networks 6.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes layer 2 ("L2") EVPN service. Intermediate network 12 represents an L2/L3 switch fabric for one or more customer networks that may implement an L2 EVPN service. An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and form a single L2 network. In a way, EVPN enables a form of a transparent local area network ("LAN") connection between two customer sites that each operates an L2 network and, for this reason, EVPN may also be referred to as a "transparent LAN service."

In the example of FIG. 1, provider edge network devices 10A-10D (collectively, "PE devices 10") provide customer endpoints 4A-4B (collectively, "endpoints 4") associated with customer networks 6 with access to intermediate network 12 via customer edge network devices 8A-8B (collectively, "CE devices 8"). PE devices 10 and CE devices 8 may each represent a router, switch, or other suitable network device that participates in an L2 virtual private network ("L2VPN") service, such as an EVPN. Each of endpoints 4 may represent one or more non-edge switches, routers, hubs, gateways, security devices such as firewalls, intrusion detection, and/or intrusion prevention devices, servers, computer terminals, laptops, tablets, printers, databases, wireless mobile devices such as cellular phones or personal digital assistants, wireless access points, bridges, cable modems, application accelerators, or other network devices.

The configuration of network system 2 illustrated in FIG. 1 is merely an example. For example, a network system may include any number of customer networks. Nonetheless, for ease of description, only customer networks 6A-6B are illustrated in FIG. 1. Although additional network devices are not shown for ease of explanation, it should be understood that network system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

An EVPN may operate over a Multi-Protocol Label Switching (MPLS) configured network and use MPLS labels to forward network traffic accordingly. MPLS is a mechanism used to engineer traffic patterns within IP networks according to the routing information maintained by the network devices in the networks. By utilizing MPLS protocols, such as Label Distribution Protocol (LDP) or Resource Reservation Protocol with Traffic Engineering extensions (RSVP-TE), a source device can request a path (e.g., Label Switched Path (LSP)) through a network, e.g., intermediate network 12, to a destination device. An LSP defines a distinct path through the network to carry MPLS packets from the source device to a destination device. Using an MPLS protocol, each router along an LSP allocates a label and propagates the label to the closest upstream router along the path. Routers along the path add or remove the labels and perform other MPLS operations to forward the MPLS packets along the established path. Additional information with respect to the EVPN protocol is described in "BGP MPLS-Based Ethernet VPN," RFC 7432, Internet Engineering Task Force (IETF), February 2015, the entire contents of which is incorporated herein by reference.

To configure an EVPN, a network operator of intermediate network 12 configures, via configuration or management interfaces, various devices, e.g., PE devices 10, included within intermediate network 12 that interface with L2 customer networks 6. The EVPN configuration may include an EVPN instance ("EVI") 3, which comprises of one or more broadcast domains. EVPN instance 3 is configured within intermediate network 12 for customer networks 6 to enable endpoints 4 within customer networks 6 to communicate with one another via the EVI as if endpoints 4 were directly connected via an L2 network. Generally, EVI 3 may be associated with a virtual routing and forwarding instance ("VRF") on a PE device, such as any of PE devices 10A-10D. Consequently, multiple EVIs (not shown) may be configured on PE devices 10A-10D for an Ethernet segment, e.g., Ethernet segment 14, each of the EVIs providing a separate, logical L2 forwarding domain. As used herein, an EVI is an EVPN routing and forwarding instance spanning PE devices 10A-10D participating in the EVI. In the example of FIG. 1, each of PE devices 10 is configured with EVI 3 and exchanges EVPN routes to implement EVI 3, as further described below.

Each of PE devices 10 uses MAC routes specifying the MAC addresses learned by other PE devices to determine how to forward L2 communications to MAC addresses that belong to devices connected to other PE devices, i.e., to remote CE devices 8 and/or devices behind CE devices operatively coupled to PE devices (e.g., endpoints 4). That is, each of PE devices 10 determine whether Ethernet frames can be sent directly to a particular one of the other CE devices, PE devices 10 or whether to treat the Ethernet frames as so called broadcast, unknown unicast, or multicast ("BUM") traffic that is to be flooded within the EVPN based on the MAC addresses learning information received from the other PE devices 10.

In an EVPN configuration, a CE device is said to be multi-homed when it is coupled to two or more physically different PE devices on the same EVI when the PE devices are resident on the same physical Ethernet segment. For example, CE device 8B is coupled to PE devices 10B-10D via links 15A-15C, respectively, where PE devices 10B-10D are capable of providing L2 customer network 6B with redundant connectivity to EVPN via CE device 8B. Multi-homed devices are often employed by network operators so as to improve access to the EVPN provided by intermediate network 12 should a failure in one of egress PE devices 10B-10D or one of links 15A-15C occur. When a CE device is multi-homed to two or more PE devices, either one or all of the multi-homed PE devices are used to reach the customer network depending on the multi-homing mode of operation.

In a typical EVPN configuration, the multi-homed PE devices, e.g., PE devices 10B-10D, participate in a designated forwarder ("DF") election for each Ethernet segment identifier ("ESI"), such as the ESI for Ethernet segment 14. The PE device that assumes the primary role for forwarding BUM traffic to the CE device is called the designated forwarder. That is, PE device 10B elected as a DF for Ethernet segment 14 assumes responsibility for forwarding BUM traffic, received from intermediate network 12, toward CE device 8B coupled to Ethernet segment 14. Among the remaining PE devices (e.g., PE devices 10C and 10D) coupled to Ethernet segment 14, PE device 10D may be elected as a backup designated forwarder ("BDF" or "backup DF") and PE device 10C is a non-designed forwarder ("non-DF") and do not forward BUM traffic received from the core network into Ethernet segment 14. In the event of a failure to the DF, the PE device designated as a backup DF becomes the DF following a global repair process in which the current DF is withdrawn and a new DF election is performed. In the example of FIG. 1, PE device 10B is elected the DF for Ethernet segment 14, PE device 10D is elected a backup DF, and PE device 10C is a non-DF.

To enable PE devices 10 connected to the same Ethernet segment 14 to automatically discover one another and for purposes of DF election per Ethernet segment, each of PE devices 10 advertises an Ethernet segment route (EVPN Type 4 route), which is typically unique across all EVPN instances (EVIs), for each of the Ethernet segments multi-homed by the PE device. For example, each of PE devices 10 may use Border Gateway Protocol (BGP) to advertise an Ethernet segment route that includes a Route Distinguisher (RD), Ethernet Segment Identifier (ESI), and an originating network device's network address (e.g., IP address).

In addition, for each EVI, the EVPN protocol directs the PE devices to output a routing protocol message advertising an Ethernet Auto-Discovery (AD) route (EVPN Type 1 route) specifying the relevant ESI for the Ethernet segment coupled to the EVPN instance. That is, each of PE devices 10 may advertise an Ethernet AD route per Ethernet segment to advertise reachability of the Ethernet segment on the PE device. For example, each of PE devices 10 for each EVI may use BGP to advertise an Ethernet AD route that includes an RD (which may include, e.g., an IP address of the originating PE device), ESI, Ethernet Tag Identifier, and MPLS label that identifies the Ethernet segment ("ESI label"). Each of the routes are advertised and imported by all multi-homed and remote PE devices that share the same EVI on the advertising ESI. In the example of FIG. 1, each of PE devices 10B-10D of EVI 3 advertise and import the routes described above to discover each other and to elect a designated forwarder for Ethernet segment 14.

In some examples, Ethernet Tags are used to identify a particular broadcast domain, e.g., a VLAN, in an EVI. A PE device may advertise a unique EVPN label per <Ethernet Segment Identifier (ESI), Ethernet Tag> combination. This label assignment methodology is referred to as a per <ESI, Ethernet Tag> label assignment. Alternatively, a PE device may advertise a unique EVPN label per media access control (MAC) address. In still another example, a PE device may advertise the same single EVPN label for all MAC addresses in a given EVI. This label assignment methodology is referred to as a per EVI label assignment.

Once the EVPN is operational for the {EVI, ESI} pair, PE devices 10B-10D output routing protocol messages to remote PE device 10A to announce media access control (MAC) addresses associated with customer equipment in customer network 6B. For example, PE devices 10 output BGP MAC routes including an RD, ESI, Ethernet Tag Identifier, MAC address and MAC address length, network address and network address length, and MPLS label, for example. Additional information with respect to the EVPN protocol is described in "BGP MPLS-Based Ethernet VPN," Internet Engineering Task Force (IETF), RFC 7432, February 2015, the entire content of which is incorporated herein by reference.

To enable delivery of BUM packets across the EVPN network, PE devices 10 may each advertise an inclusive multicast Ethernet tag route (IMET) (EVPN Type 3 route) that provides a remote PE device 10 with the information about the tunnels (e.g., provider tunnels ("P-tunnels")) that should be used when sending BUM packets across the EVPN network. Each of PE devices 10 for each EVI may use BGP to advertise an IMET route that includes an RD, Ethernet Tag Identifier, network address length, and the originating network device's network address. In this way, PE devices may use the information from the IMET routes to tunnel BUM packets across the EVPN network to other PE devices.

In the event an access link between PE device 10B and CE device 10B goes down (otherwise referred to herein as "egress access link failure"), BUM traffic sent from PE device 10A cannot typically reach CE device 8B until a new DF is elected. PE device 10D, as the backup DF, may assume the role of DF after performing global repair. To perform global repair, the failed designated forwarder PE device may typically advertise routes (e.g., Ethernet AD routes (Type 1) and Ethernet Segment routes (Type 4)) to withdraw the failed PE device from the Ethernet segment, which triggers a new DF election for the Ethernet segment. However, the global repair process may take some time (e.g., depending on the topology, configuration and churn in the network), which may result in the occurrence of traffic black-holing (e.g., where an ingress PE device may continue forwarding BUM traffic to the original designated forwarder PE device before the backup DF transitions to the DF, which results in dropped packets).

In some examples, fast reroute (FRR) may be used during (or prior to) the global repair process to reroute traffic in response to a link or node failure. To generally perform fast reroute, a PE device pre-installs a backup path to reroute traffic to a backup device while the control plane of the PE device goes through the global repair process. Without the techniques described in this disclosure, a designated forwarder PE device is unable to establish a backup path to another PE device of the Ethernet segment due to a "split-horizon filtering" rule. For example, PE devices of the EVPN apply the split-horizon filtering rule to prevent the PE devices from forwarding BUM traffic back to the source (e.g., flooding a BUM packet received from the core network back into the core network). To achieve split-horizon filtering, a BUM packet that is sent into the core network is typically encapsulated with an ESI label that identifies the Ethernet segment of origin such that when a PE device receives the BUM packet encapsulated with the ESI label, the PE device does not forward the BUM packet to the Ethernet segment for which the ESI label is associated with. Moreover, due to the DF filtering rule, only the elected DF of an Ethernet segment may forward BUM traffic received from the core network on the Ethernet segment to the local CE device. Because the global repair process may not be completed and a new DF is not yet elected, the backup DF (or any other PE device of the Ethernet segment) is typically unable to send the traffic on the Ethernet segment to the local CE device. Additional examples of the split-horizon filtering and DF filtering rules are described in RFC 7432, incorporated above.

In accordance with the techniques described in this disclosure, PE devices of the Ethernet segment may provide fast reroute for BUM traffic in EVPN. In the example of FIG. 1, PE device 10D (the backup DF for Ethernet segment 14), may allocate a label (referred to herein as "BUM fast reroute label" or "protector label") that indicates PE device 10D is to "protect" Ethernet segment 14 in the event an egress access link of the DF fails (e.g., access link 15A). For ease of illustration, the example of FIG. 1 is described with respect to allocating a single BUM fast reroute label for a single Ethernet segment (e.g., Ethernet segment 14). The techniques may also include allocating a BUM fast reroute label for each of a plurality of Ethernet segments. For example, if PE device 10D is a backup DF for Ethernet segment 14 and an additional Ethernet segment (not shown), PE device 10 may allocate a BUM fast reroute label for each of the Ethernet segments (referred to as "BUM fast reroute label per Ethernet segment"). In some examples, the allocation of the BUM fast reroute label may occur in response to the BDF election or prior to the PE device elected as the BDF.

As further described below, PE device 10D may also configure its forwarding component to forward incoming BUM traffic to CE device 8B if the incoming BUM traffic includes the BUM fast reroute label. The configuration of this forwarding behavior is not dependent on control plane signaling (e.g., EVPN routes exchanged during global repair process). For example, PE device 10D may configure an access-facing interface (e.g., interface to Ethernet segment 14) in an "up" state to forward BUM traffic including the BUM fast reroute label when it is a backup DF for Ethernet segment 14. As such, PE device 10D may forward the BUM packet even though PE device 10D is not the designated forwarder. Although the backup DF PE device is configured as the protector of the Ethernet segment in the example of FIG. 1, any of the PE devices of the Ethernet segment that is not the designated forwarder may be configured as the protector for the Ethernet segment (e.g., PE device 10C).

PE device 10D advertises the BUM fast reroute label to the designated forwarder (e.g., PE device 10B) of the Ethernet segment for which it is to protect. As one example, PE device 10D may advertise the Ethernet AD route to PE device 10B (e.g., illustrated as route 16 of FIG. 1) including an extended community specifying the BUM fast reroute label. Although described with respect to an Ethernet AD route, the BUM fast reroute label may alternatively, or additionally, be advertised with any EVPN route that has ESI information in the Network Layer Reachability Information (NLRI).

PE device 10B receives the BUM fast reroute label from PE device 10D and installs in its forwarding component a backup path (e.g., backup next hop) that leads to PE device 10D. For example, PE device 10B may configure within its forwarding component a backup path specifying operations for adding the BUM fast reroute label (e.g., as part of a label stack of one or more labels) to any BUM traffic received over intermediate network 12 and to forward the modified BUM traffic to a single recipient (e.g., backup DF PE device 10D), including the BUM fast reroute label, back into intermediate network 12 to PE device 10D. As one example, PE device 10B may add a label stack including the BUM fast reroute label, an IMET label (e.g., learned from an IMET route advertised by PE device 10D to other PE devices 10) to deliver the BUM traffic to PE device 10D, and a transport label (e.g., MPLS label or IP address) to reach PE device 10D. In some examples, the BUM fast reroute label may be the innermost label in the label stack.

If there is no link failure (e.g., access link 15A is operating normally), PE device 10B forwards BUM traffic that it receives from intermediate network 12 on Ethernet segment 14 to CE device 8B using a primary path (e.g., a primary next hop). For example, PE device 10B may have a primary path configured with a next hop to an interface to Ethernet segment 14. When access link 15A fails, PE device 10B may use the backup path to reroute BUM traffic that it receives from intermediate network 12, e.g., BUM packet 18, to PE device 10D.

For example, PE device 10B may implement a Bidirectional Forwarding Detection (BFD) protocol to detect whether access link 15A has failed. Examples of BFD may include session-BFD (S-BFD) or Multihop-BFD (MH-BFD). PE device 10B may determine that access link 15A has failed based on determining that BFD messages have not been received from CE device 8B in a configured time period, for example. PE device 10B may also detect whether an Ethernet interface or aggregate Ethernet interface has failed using an Ethernet failure detection mechanism (e.g., link fault signaling (LFS)) at the physical layer without using BFD.

In response to determining that access link 15A (or an Ethernet interface or aggregate Ethernet interface) has failed, PE device 10B may configure its forwarding component to use the backup path to reroute BUM traffic. In this way, when PE device 10B receives BUM packet 18 from intermediate network 12, the forwarding component of PE device 10B may automatically perform operations to add the label stack including, in one example, the BUM fast reroute label (as the innermost label of the label stack), the IMET label, and the transport label of PE device 10D to BUM packet 18 (illustrated as BUM packet 18' in FIG. 1) and send BUM packet 18' to PE device 10D over intermediate network 12.

When PE device 10D receives BUM packet 18', PE device 10D removes the transport and/or IMET labels, determines that the inner packet of the label stack of the BUM packet includes the BUM fast reroute label, and forwards the BUM traffic into Ethernet segment 14 to CE device 8B. In these examples, PE device 10D may use the IMET label to determine the EVI (e.g., EVI 3) and its bridge domain and the BUM fast reroute label is used to determine the Ethernet segment associated with the BUM fast reroute label (e.g., Ethernet segment 14).

Because PE device 10D may determine the Ethernet segment from the BUM fast reroute label, the BUM packet no longer needs to include an ES label (which is typically included in the packet when flooding a BUM packet back into the core network) and does not perform split-horizon filtering, which would otherwise prevent PE device 10D from forwarding BUM packet on Ethernet segment 14 to CE device 8B.

Figure 2:
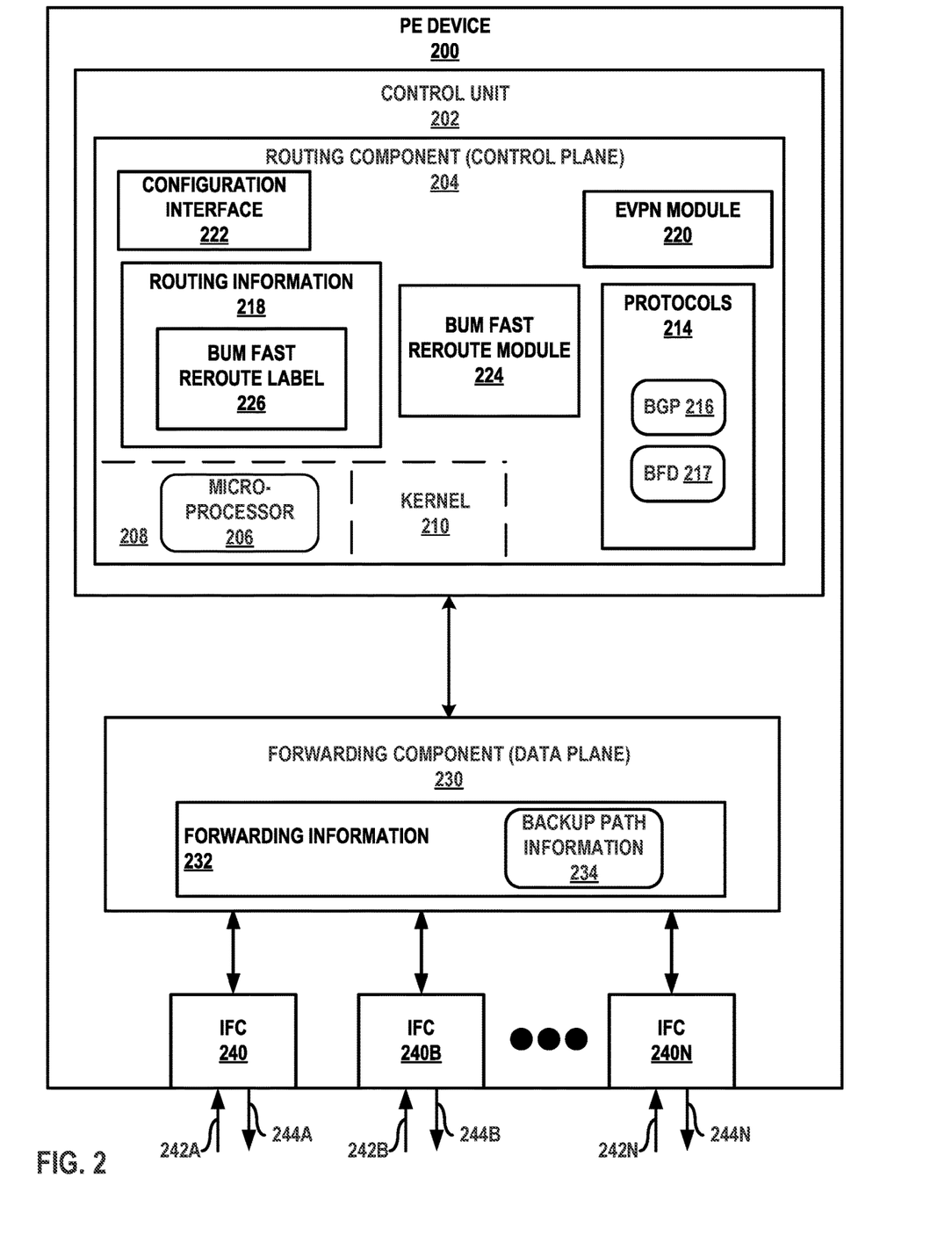
FIG. 2 is a block diagram illustrating an example of a provider edge device configured to provide fast reroute for BUM traffic in EVPN, in accordance to one or more aspects of the techniques described herein.

FIG. 2 is a block diagram illustrating an example of a provider edge device configured to provide fast reroute for BUM traffic for a multi-homed node failure, in accordance to one or more aspects of the techniques described herein. PE device 200 is described with respect to PE devices 10B and 10D of FIG. 1, but may be performed by any PE device.

As shown in FIG. 2, PE device 200 includes a control unit 202 having a routing component 204 (control plane), and control unit 202 that is coupled to forwarding component 230 (data plane). Forwarding component 230 is associated with one or more interface cards 240A-240N ("IFCs 240") that receive packets via inbound links 242A-242N ("inbound links 242") and send packets via outbound links 244A-244N ("outbound links 244"). IFCs 240 are typically coupled to links 242, 244 via a number of interface ports (not shown). Inbound links 242 and outbound links 244 may represent physical interfaces, logical interfaces, or some combination thereof.

Elements of control unit 202 and forwarding component 230 may be implemented solely in software, or hardware, or may be implemented as combinations of software, hardware, or firmware. For example, control unit 202 may include one or more processors 206 that may represent, one or more microprocessors, digital signal processors ("DSPs"), application specific integrated circuits ("ASICs"), field programmable gate arrays ("FPGAs"), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory ("RAM"), read only memory ("ROM"), programmable read only memory (PROM), erasable programmable read only memory ("EPROM"), electronically erasable programmable read only memory ("EEPROM"), non-volatile random access memory ("NVRAM"), flash memory, a hard disk, a CD-ROM, a floppy disk, a cassette, a solid state drive, magnetic media, optical media, or other computer-readable media. Computer-readable media may be encoded with instructions corresponding to various aspects of PE device 200, e.g., protocols, processes, and modules. Control unit 202, in some examples, retrieves and executes the instructions from memory (not shown) for these aspects.

Routing component 204 operates as a control plane for PE device 200 and includes an operating system that provides a multi-tasking operating environment for execution of a number of concurrent processes. Routing component 204 includes a kernel 210, which provides a run-time operating environment for user-level processes. Kernel 210 may represent, for example, a UNIX operating system derivative such as Linux or Berkeley Software Distribution ("BSD"). Kernel 210 offers libraries and drivers by which user-level processes may interact with the underlying system. Hardware environment 208 of routing component 204 includes processor 206, described above, that executes program instructions loaded into a main memory (not shown in FIG. 2) from a storage device (also not shown in FIG. 2) in order to execute the software stack, including both kernel 210 and processes executing on the operating environment provided by kernel 210.

Kernel 210 provides an operating environment that executes various protocols 214 at different layers of a network stack, including protocols for implementing EVPN networks. For example, routing component 204 includes network protocols that operate at a network layer of the network stack. Protocols 214 provide control plane functions for storing network topology in the form of routing tables or other structures, executing routing protocols to communicate with peer routing devices and maintain and update the routing tables, and provide management interface(s) to allow user access and configuration of PE device 200. That is, routing component 204 is responsible for the maintenance of routing information 218 to reflect the current topology of a network and other network entities to which PE device 200 is connected. In particular, routing protocols 214 periodically update routing information 218 to reflect the current topology of the network and other entities based on routing protocol messages received by PE device 200.

In the example of FIG. 2, routing protocols 214 include the Border Gateway Protocol ("BGP") 216 for exchanging routing information with other routing devices and for updating routing information 218. In EVPN, PE device 200 may use BGP to advertise to other PE devices the MAC addresses PE device 200 has learned from local customer edge network devices to which PE device 200 is connected. In particular, PE device 200 may use a BGP route advertisement message to announce reachability information for the EVPN, where the BGP route advertisement specifies one or more MAC addresses learned by PE device 200 instead of L3 routing information. PE device 200 updates routing information 218 based on the BGP route advertisement message. Routing protocols 214 may also include Bidirectional Forwarding Detection ("BFD") protocol 217 for exchanging BFD messages to detect node failure. In some examples, BFD protocol 217 may include seamless-BFD (S-BFD) or multihop-BFD (MH-BFD). Routing component 204 may include other protocols not shown in FIG. 2, such as an MPLS label distribution protocol and/or other MPLS protocols.

Routing information 218 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, forwarding information 232 is generated based on selection of certain routes within the network and maps packet key information (e.g., L2/L3 source and destination addresses and other select information from a packet header) to one or more specific next hop forwarding structures within forwarding information 232 and ultimately to one or more specific output interface ports of IFCs 240. Routing component 204 may generate forwarding information 232 in the form of a radix tree having leaf nodes that represent destinations within the network, a series of tables, a link list, a database, a flat file, or various other data structures.

Routing component 204 also includes an EVPN module 220 that performs L2 learning using BGP 216. EVPN module 220 may maintain tables for each EVI established by PE device 200, or in alternative examples may maintain one or more tables that are independent of each respective EVI. PE device 200 may use EVPN module 220 to advertise, e.g., EVPN routes including Ethernet AD routes (Type 1) to advertise reachability of PE device 200 for an Ethernet segment, inclusive multicast Ethernet Tag (IMET) routes (Type 3) to advertise information about PE device 200 that is used to send BUM traffic to PE device 200, and Ethernet segment routes (Type 4) to discover other PE devices of the Ethernet segment and for purposes of DF election (and backup DF election) for the Ethernet segment. EVPN module 220 may store information from the routes, such as the identification of PE devices of an Ethernet segment and additional information provided by extended communities of the EVPN routes.

Routing component 204 includes a configuration interface 222 that receives and may report configuration data for PE device 200. Configuration interface 222 may represent a command line interface; a graphical user interface; Simple Network Management Protocol ("SNMP"), Netconf, or another configuration protocol; or some combination of the above in some examples. Configuration interface 222 receives configuration data configuring the PE device 200, and other constructs that at least partially define the operations for PE device 200, including the techniques described herein. For example, an administrator may, after powering-up, activating or otherwise enabling PE device 200 to operate within a network, interact with control unit 202 via configuration interface 222 to configure, e.g., BUM fast reroute module 224.

Forwarding component 230 represents hardware and logic functions that provide high-speed forwarding of network traffic. Forwarding component 230 implements data plane (also known as a "forwarding plane") functionality to handle packet processing from ingress interfaces on which packets are received to egress interfaces to which packets are sent. Forwarding component 230 determines data packet forwarding through PE device 200, applies services, rate limits packet flows, filters packets, and otherwise processes the packets using forwarding structures and lookup data installed by routing component 204 to the forwarding component 230.

Forwarding component 230 binds actions to be performed on packets received by the forwarding component to identification of one or more properties of the packets. That is, upon identifying certain packet properties, forwarding component 230 performs the action abound to the properties. Packet properties may include packet metadata such as a particular packet's ingress interface or egress interface (as determined by the forwarding component) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Forwarding component 230 typically includes a set of one or more forwarding chips programmed with forwarding information (e.g., forwarding information 232) that maps network destinations with specific next hops and the corresponding output interface ports. For example, forwarding component 230 may include one or more programmable application-specific integrated circuits (ASIC)-based packet processors (not shown) that process packets to identify packet properties and perform actions bound to the properties. The ASIC-based packet processors include key engines that execute microcode (or "microinstructions") to control and apply fixed hardware components of the ASICs to process packet "keys." A packet key includes packet fields and other parameters that determine a flow of packet processing for the packet along an internal forwarding path. A forwarding path comprises programmable, executable microcode and fixed hardware components that determine the packet processing actions and other operations performed by the key engines. The forwarding path may include, for example, executable instructions, programmable logic, and application-specific logic that perform lookups, rate limit packet flows, and manipulate packet keys, among other functions.

In general, when PE device 200 receives a packet via one of inbound links 242, forwarding component 230 identifies an associated next hop for the data packet by traversing the programmed forwarding information based on information within the packet, e.g., in the case of BUM packet forwarding, the transport label and/or inclusive multicast Ethernet tag label. Forwarding component 230 forwards the packet on one of outbound links 244 mapped to the corresponding next hop.

Forwarding component 230 stores forwarding information 232 for each Ethernet VPN Instance (EVI) established by PE device 200 to associate network destinations with specific next hops and the corresponding interface ports. Forwarding unit 230 forwards the data packet on one of outbound links 244 to the corresponding next hop in accordance with forwarding information 232 associated with an Ethernet segment. At this time, forwarding component 230 may push and/or pop labels from the packet to forward the packet along a correct LSP. Additional information regarding next hops is described in PLATFORM-INDEPENDENT CONTROL PLANE AND LOWER-LEVEL DERIVATION OF FORWARDING STRUCTURES, U.S. Pat. No. 7,990,993, filed Nov. 6, 2008, and additional information regarding the configuration of forwarding paths within the forwarding component is described in PACKET FORWARDING PATH PROGRAMMING USING HIGH-LEVEL DESCRIPTION LANGUAGE," U.S. Pat. No. 8,806,058, filed Jul. 29, 2011, the entire contents of each of which is incorporated by reference herein.

In accordance with the techniques described herein, routing component 204 may include a BUM fast reroute module 224 that performs the techniques described in this disclosure. For example, BUM fast reroute module 224 may use EVPN module 220 to identify the PE devices of Ethernet segment 14 that includes PE device 200, generate and store labels for each of the PE devices of the Ethernet segment. Using the information learned from EVPN routes, the BUM fast reroute module 224 may generate a BUM fast reroute label that indicates PE device 200 is to protect a given Ethernet segment (e.g., Ethernet segment 14 of FIG. 1). PE device 200 may, for example, use BGP 216 to advertise the BUM fast reroute label (e.g., carried in an extended community of an Ethernet AD route) to other PE devices of the Ethernet segment (e.g., PE devices 10B and 10C of FIG. 1), including the designated forwarder. In some examples, the BUM fast reroute label is stored within routing information 218 (illustrated as BUM fast reroute label 226) or within any data structure for BUM fast reroute module 224 or EVPN module 220.

BUM fast reroute module 224 of PE device 200 (operating as the backup designated forwarder PE device) may also configure forwarding component 230 with backup path information 234 that controls whether forwarding unit 230 forwards an incoming BUM packet on one of outbound links 244 to the Ethernet segment. For example, BUM fast reroute module 224 may configure backup path information 234 that includes one or more operations to cause forwarding component 230 to forward an incoming BUM packet that includes the BUM fast reroute label. For example, backup path information 234 may map the BUM fast reroute label 226 with an access-facing interface to Ethernet segment 14 and specify the access-facing interface to the Ethernet segment in an "up" state to forward BUM traffic including the BUM fast reroute label. Forwarding information 232 may also specify the access-facing interface in a "down" state for when the BUM packet includes an ESI label associated with the Ethernet segment connected to the access-facing interface (per split-horizon filtering rules).

In this way, when PE device 200 receives, via one of inbound links 242 of a core-facing interface, a BUM packet including a BUM fast reroute label that matches the BUM fast reroute label that was advertised to the designated forwarder, the forwarding component 230 may, according to backup path information 234, send the BUM packet on the Ethernet segment via the identified access-facing interface to the Ethernet segment.

In an example where PE device 200 is operating as a designated forwarder of the Ethernet segment (e.g., PE device 10B of Ethernet segment 14 of FIG. 1), BUM fast reroute module 224 may, in response to receiving the BUM fast reroute label from another PE device of the Ethernet segment (e.g., backup DF PE device 10D of FIG. 1), configure a backup path to backup DF PE device 10D.

For example, PE device 200 may use BGP 216 to receive EVPN AD routes from other PE devices of Ethernet segment 14. BUM fast reroute module 224 may use EVPN module 220 to determine whether the incoming Ethernet AD routes include an extended community specifying a BUM fast reroute label, and may store the BUM fast reroute label in routing information 218 (e.g., illustrated as BUM fast reroute label 226 in FIG. 3).

In response to receiving a BUM fast reroute label, BUM fast reroute module 224 may configure within forwarding component 230 a backup path (e.g., backup next hop) to backup DF PE device 10D (illustrated as backup path information 234). For example, BUM fast reroute module 224 may install the BUM fast reroute label in forwarding information 232 and one or more operations (e.g., instructions) that cause the forwarding component 230 to add the BUM fast reroute label 226 to an incoming BUM packet that is to be rerouted on the backup path (illustrated in FIG. 2 as backup path information 234) and to forward the BUM packet including the BUM fast reroute label to a core-facing interface to the core network (e.g., intermediate network 12 of FIG. 1). As one example, backup path information 234 may include instructions that cause the forwarding component 230 to add a label stack including the BUM fast reroute label 226 (as an innermost label of the label stack), an IMET label to send the BUM traffic to backup DF PE device 10D, and a transport label. Routing component 204 may also configure within forwarding component 230 a primary path (e.g., primary next hop) to forward BUM traffic received from the core network to an access-facing interface to Ethernet segment 14 when there is no failure. As one example, backup path information 234 may including the following configuration:

ES interface (weight X)**
backup path (weight Y,
   label stack: BUM fast reroute label, IMET
   label, transport label
** with X < Y PE device 200 may use BFD 217 to determine whether access link 15A (e.g., one of outbound links 244) to CE device 8B has failed. For example, PE device 200 may implement BFD protocol 217 to detect access link failures. For example, PE device 200 may determine an access link (e.g., link 15A of FIG. 1) connected to a customer edge device (e.g., CE device 8B of FIG. 1) has failed based on determining that BFD messages have not been received from CE device 8B in a configured time period. If PE device 200 determines that access link 15A has failed, BUM fast reroute module 224 may configure forwarding component 230 to forward BUM traffic received from the core network using the backup path, e.g., by configuring the backup path (e.g., backup path information 234) with a higher weight than the primary path. PE device 200 may also detect whether an Ethernet interface or aggregate Ethernet interface has failed using an Ethernet failure detection mechanism (e.g., link fault signaling (LFS)) at the physical layer without using BFD.

In this way, when PE device 200 receives, via one of inbound links 242 of a core-facing interface, BUM traffic to be forwarded to the Ethernet segment, and when the access link from PE device 200 to the local CE device has failed, forwarding component 230 may add the BUM fast reroute label (e.g., as part of the label stack including the BUM fast reroute label, IMET label, and transport label) to the incoming BUM packet and forward the BUM packet via one of outbound links 244 of the core-facing interface to backup DF PE device 10D.

Figure 3:
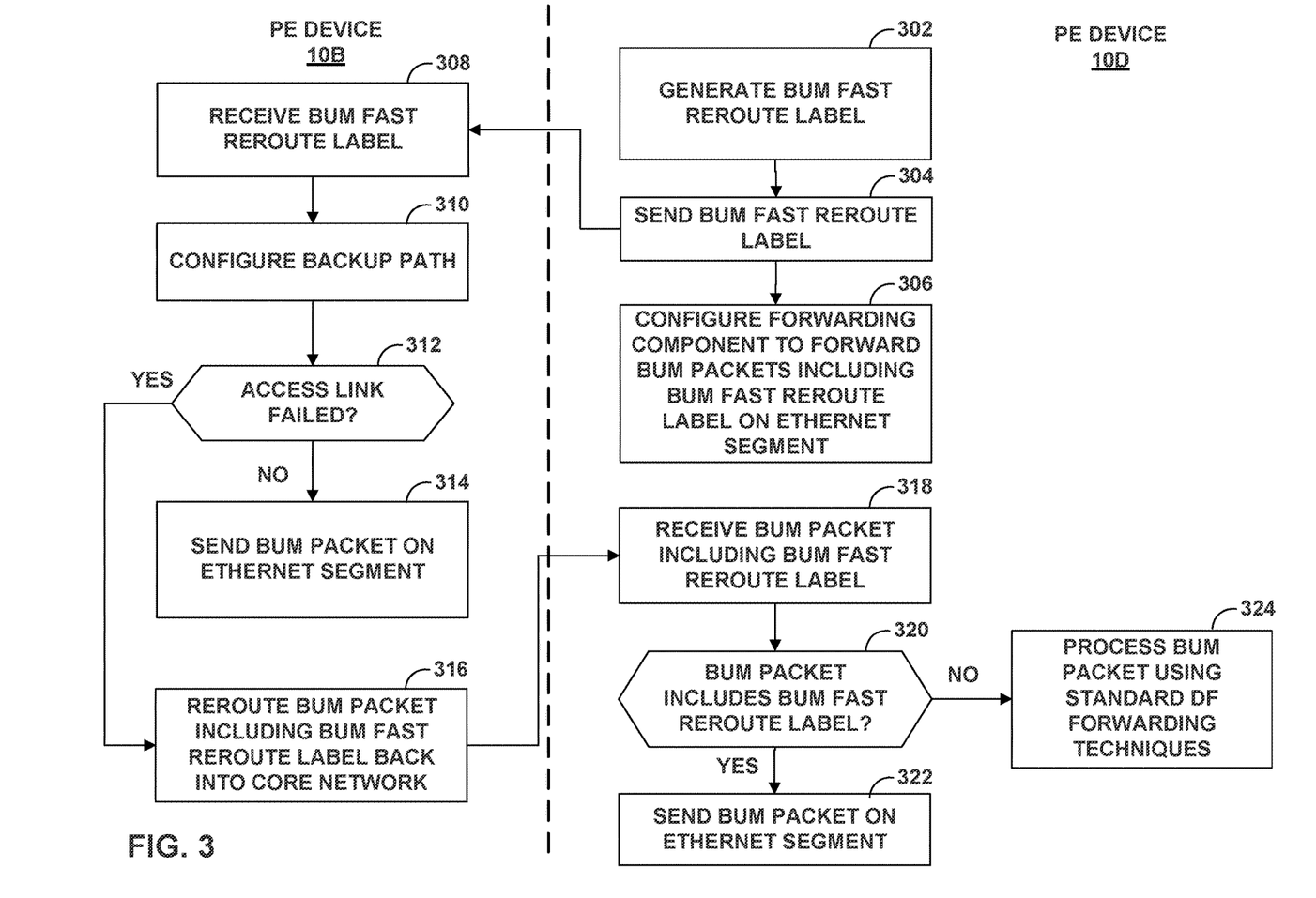
FIG. 3 is a flowchart illustrating an example operation of PE devices configured to provide fast reroute for BUM traffic for a multi-homed node failure, in accordance with one or more aspects of the techniques described in this disclosure.

FIG. 3 is a flowchart illustrating an example operation of PE devices, in accordance with one or more aspects of the techniques described in this disclosure. FIG. 3 will be described with respect PE devices 10 of FIG. 1 and PE device 200 of FIG. 2.

In the example of FIG. 3, PE device 10D of Ethernet segment 14 may generate a BUM fast reroute label indicating PE device 10D is to protect Ethernet segment 14 in the event an access link of the designated forwarder fails (302) and send the label to other PE devices of Ethernet segment 14, including PE device 10B that is elected as the designated forwarder (304). For example, PE device 10B may advertise an Ethernet AD route including an extended community specifying the BUM fast reroute label.

PE device 10D may also configure its forwarding component to send BUM packets that include the BUM fast reroute label on the Ethernet segment (306). For example, BUM fast reroute module 224 of the routing component 204 of PE device 10D may configure its forwarding component 230 to send BUM traffic that includes the BUM fast reroute label on the access-facing interface to the Ethernet segment. More specifically, BUM fast reroute module 224 may configure the backup path information 234 to include an "up" state to cause PE device 10D to forward BUM traffic received from the core network on the access-facing interface to the Ethernet segment if the BUM traffic includes the BUM fast reroute label.

Designated forwarder PE device 10B receives the BUM fast reroute label from PE device 10D (308) and may configure within its forwarding component 230 a backup path (e.g., backup next hop) to the backup designated forwarder PE device 10D over the core network (310). For example, BUM fast reroute module 224 of the routing component 204 of PE device 10B may install the BUM fast reroute label within the forwarding component 230 and one or more operations that causes the forwarding component 230 to add the BUM fast reroute label to BUM packets received from the core network. As one example, the forwarding component of PE device 10B is configured with instructions that cause the forwarding component 230 to push a label stack including the BUM fast reroute label (e.g., as the innermost label of the label stack), an IMET label to send the BUM traffic to PE device 10D over the core network, and a transport label to reach PE device 10D.

PE device 10B may detect whether an access link to the CE device (e.g., access link 15A to CE device 8B) has failed (312). For example, PE device 10B may implement BFD protocol 317 to detect whether the access link has failed. If the access link has not failed ("NO" of step 312), PE device 10B sends BUM packets received from the core network using the primary path, e.g., sending the BUM packet on an access-facing interface to Ethernet segment 14 (314). If the access link has failed ("YES" of step 312), PE device 10B reroutes BUM packets received from the core network using the backup path (316). For example, the forwarding component of PE device 10B may add the BUM fast reroute label (e.g., as part of a label stack including the BUM fast reroute label, the IMET label, and the transport label) and sends the BUM packet including the BUM fast reroute label on the backup path to PE device 10D over the core network.

When PE device 10D receives a BUM packet (318), PE device 10D determines if the BUM packet includes the BUM fast reroute label (320). If PE device 10D determines that the BUM packet includes the BUM fast reroute label ("YES" of step 320), PE device 10D sends the BUM packet on Ethernet segment 14 to CE device 8B (322). Alternatively, or additionally, if PE device 10D receives a BUM packet that does not include the BUM fast reroute label ("NO" of step 320), PE device 10D processes the BUM packet using standard DF forwarding techniques (including forwarding rules such as DF filtering and split-horizon filtering) (324).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

What is claimed is:

1. A method comprising:
   receiving, by a first provider edge (PE) device of an Ethernet segment and from a second PE device of the Ethernet segment, a label identifying the second PE device as a protector for the Ethernet segment, wherein the Ethernet segment provides a customer edge (CE) device that is multi-homed to the first PE device and the second PE device with reachability to an Ethernet Virtual Private Network (EVPN) instance, and wherein the first PE device is a designated forwarder for the Ethernet segment;
   configuring, by a routing component of the first PE device and within a forwarding component of the first PE device, a backup path to the second PE device, wherein configuring the backup path comprises installing the label within the forwarding component and one or more operations causing the forwarding component to add the label to a broadcast, unknown unicast, and multicast (BUM) packet received from a core network;
   receiving, by the forwarding component of first PE device, a BUM packet from the core network; and
   rerouting, by the forwarding component of the first PE device and when an access link from the first PE device to the CE device has failed, the BUM packet on the backup path by adding the label to the BUM packet and forwarding the BUM packet including the label on the backup path to the second PE device over the core network.

2. The method of claim 1, wherein the second PE device is a backup designated forwarder for the Ethernet segment.

3. The method of claim 1, wherein receiving the label comprises receiving the label specified in an extended community of an Ethernet Auto-Discovery route.

4. The method of claim 1, wherein adding the label to the BUM packet comprises:
   pushing a label stack including the label, an inclusive multicast Ethernet tag (IMET) label to send the BUM packet to the second PE device, and a transport label to reach the second PE device.

5. The method of claim 1, further comprising:
   configuring, by the routing component of the first PE device and within the forwarding component of the first PE device, a primary path to the CE device over the Ethernet segment.

6. The method of claim 5, further comprising:
   determining that the access link from the first PE device to the CE device has failed; and
   in response to determining that the access link from the first PE device to the CE device has failed, configuring, by the routing component of the first PE device and within the forwarding component of the first PE device, the backup path with a higher weight than the primary path.

7. A method comprising:
   generating, by a routing component of a first provider edge (PE) device of an Ethernet segment, a label identifying the first PE device as a protector for the Ethernet segment, wherein the Ethernet segment provides a customer edge (CE) device that is multi-homed to the first PE device and a second PE device with reachability to an Ethernet Virtual Private Network (EVPN) instance, and wherein the second PE device is a designated forwarder for the Ethernet segment and the first PE device is not the designated forwarder for the Ethernet segment;
   sending, by the routing component of the first PE device, the label to the second PE device;
   configuring, by a routing component of the first PE device, a forwarding component of the first PE device to forward a broadcast, unknown unicast, and multicast (BUM) packet that is received from a core network on the Ethernet segment if the BUM packet includes the label;
   receiving, by the forwarding component of the first PE device, a BUM packet that was flooded back into the core network by the second PE device, wherein the BUM packet includes the label;

determining, by the forwarding component and based on the label of the received BUM packet, the Ethernet segment; and sending, by the forwarding component of the first PE device that is not the designated forwarder and based on the received BUM packet including the label, the BUM packet on the Ethernet segment to the CE device.

8. The method of claim 7, wherein the first PE device is a backup designated forwarder for the Ethernet segment.

9. The method of claim 7, wherein sending the label comprises sending the label specified in an extended community of an Ethernet Auto-Discovery route.

10. The method of claim 7, wherein the BUM packet comprises a first BUM packet, the method further comprising:

receiving, by the forwarding component of the first PE device, a second BUM packet from the core network, wherein the second BUM packet does not include the label; and dropping, by the forwarding component of the first PE device, the second BUM packet based on designated forwarder filtering and split-horizon filtering rules.

11. The method of claim 7, wherein the first PE device is connected to a second Ethernet segment, wherein the label comprises a first label identifying the first PE device as a protector for the first Ethernet segment, wherein the second Ethernet segment provides a second CE device that is multi-homed to the first PE device and a third PE device with reachability to the EVPN instance, wherein the BUM packet comprises a first BUM packet, and wherein the third PE device is a designated forwarder for the second Ethernet segment, the method further comprising:

generating, by the routing component of the first PE device, a second label identifying the first PE device as a protector for the second Ethernet segment;

sending, by the routing component of the first PE device, the second label to the third PE device;

configuring, by the routing component of the first PE device, the forwarding component of the first PE device to forward a second BUM packet that that includes the second label;

receiving, by the forwarding component of the first PE device and from the core network, a second BUM packet including the second label; and sending, by the forwarding component of the first PE device, the second BUM packet on the second Ethernet segment.

12. The method of claim 7, wherein configuring the forwarding component of the first PE device comprises mapping the label to the Ethernet segment.

13. A first provider edge (PE) device of an Ethernet segment, comprising:

a forwarding component; and a routing component configured to:

receive, from a second PE device of the Ethernet segment, a label identifying the second PE device as a protector for the Ethernet segment, wherein the Ethernet segment provides a customer edge (CE) device that is multi-homed to the first PE device and the second PE device with reachability to an Ethernet Virtual Private Network (EVPN) instance, wherein the first PE device is a designated forwarder (DF) for the Ethernet segment, and wherein the second PE device is a backup designated forwarder for the Ethernet segment; and configure, within the forwarding component, a backup path to the second PE device over a core network, wherein configuring the backup path comprises installing the label within the forwarding component and one or more operations causing the forwarding component to add the label to a broadcast, unknown unicast, and multicast (BUM) packet received from the core network; and wherein, in response to the configuration of the backup path, the forwarding component is configured to:

receive a BUM packet from the core network; and reroute, when an access link from the first PE device to the CE device has failed, the BUM packet on the backup path by adding the label to the BUM packet and forwarding the BUM packet including the label on the backup path to the second PE device over the core network.

14. The first PE device of claim 13, wherein to receive the label, the routing component is further configured to receive the label specified in an extended community of an Ethernet Auto-Discovery route.

15. The first PE device of claim 13, wherein to add the label to the BUM packet, the forwarding component is further configured to:

push a label stack on the BUM packet, wherein the label stack comprises the label, an inclusive multicast Ethernet tag (IMET) label to send the BUM packet to the second PE device, and a transport label to reach the second PE device.

16. The first PE device of claim 13, wherein the routing component is further configured to:

configure, within the forwarding component, a primary path to the CE device over the Ethernet segment.

17. The first PE device of claim 16, wherein the routing component is further configured to:

determine whether the access link from the first PE device to the CE device has failed; and in response to a determination that the access link from the first PE device to the CE device has failed, configure, within the forwarding component, the backup path with a higher weight than the primary path.

18. The first PE device of claim 13, wherein the Ethernet segment comprises a first Ethernet segment, wherein the label comprises a first label identifying the first PE device as a protector for the Ethernet segment, wherein the EVPN instance comprises a first EVPN instance, wherein the BUM packet comprises a first BUM packet, wherein the CE device comprises a first CE device, wherein the routing component is further configured to:

generate a second label identifying the first PE device as a protector for a second Ethernet segment, wherein the second Ethernet segment provides a second CE device that is multi-homed to the first PE device and a third PE device with reachability to a second EVPN instance, and wherein the third PE device is a designated forwarder for the second Ethernet segment;

send, to the third PE device, the second label; and configure the forwarding component to forward a second BUM packet that is received from the core network on the second Ethernet segment if the second BUM packet includes the second label;

wherein the forwarding component is further configured to:

receive, from the core network, a second BUM packet that includes the second label; and send the second BUM packet on the second Ethernet segment to the second CE device.

19. The first PE device of claim 18, wherein to configure the forwarding component of the first PE device, the forwarding component is further configured to map the second label to the second Ethernet segment.

20. The first PE device of claim 18, the forwarding component is further configured to:
   receive, from the core network, a third BUM packet that does not include the second label; and
   drop the third BUM packet based on designated forwarder filtering and split-horizon filtering rules.

* * * * *